(12) United States Patent
Iwao et al.

(10) Patent No.: US 7,350,352 B2
(45) Date of Patent: Apr. 1, 2008

(54) FLUID COUPLING

(75) Inventors: Nobuyuki Iwao, Kanagawa (JP); Yasushi Yamamoto, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 112 days.

(21) Appl. No.: 10/570,633

(22) PCT Filed: Sep. 2, 2004

(86) PCT No.: PCT/JP2004/013173

§ 371 (c)(1),
(2), (4) Date: Mar. 3, 2006

(87) PCT Pub. No.: WO2005/024263

PCT Pub. Date: Mar. 17, 2005

(65) Prior Publication Data
US 2006/0272323 A1    Dec. 7, 2006

(30) Foreign Application Priority Data
Sep. 5, 2003    (JP)    ............................. 2003-313485

(51) Int. Cl.
*F16H 41/26* (2006.01)
*F01D 5/02* (2006.01)

(52) U.S. Cl. ..................... 60/330; 415/131; 416/180

(58) Field of Classification Search ................. 60/330, 60/347, 349, 352; 415/126, 131; 416/180, 416/197 C
See application file for complete search history.

(56) References Cited

U.S. PATENT DOCUMENTS

| 6,334,307 B1 * | 1/2002 | Iwao et al. | .................... 60/367 |
| 6,931,844 B2 * | 8/2005 | Iwao et al. | .................... 60/349 |
| 7,048,503 B2 * | 5/2006 | Doring et al. | .............. 415/150 |

FOREIGN PATENT DOCUMENTS

JP    A 2001-50309    2/2001

* cited by examiner

*Primary Examiner*—Igor Kershteyn

(57) ABSTRACT

A fluid coupling comprising a pump having an annular pump shell with an annular core ring mounted on a pump hub and a plurality of impellers radially arranged in the pump shell; a turbine arranged being opposed to the pump and having an annular turbine shell with an annular core ring mounted on a turbine hub capable of rotating relative to the pump hub and a plurality of runners radially arranged in the turbine shell; and an operation fluid filled in the pump and in the turbine; wherein, the turbine is so constituted as to slide on the turbine hub in the axial direction thereof, and has resilient urging means for urging the turbine in a direction to separate away from the pump side; and the core ring of the pump and the core ring of the turbine are so constituted that the gaps for flowing the operation fluid into the two core rings are increased in a state where the turbine is close to the pump and that the gaps for flowing the operation fluid into the two core rings are decreased as the turbine separates away from the pump shell.

3 Claims, 9 Drawing Sheets

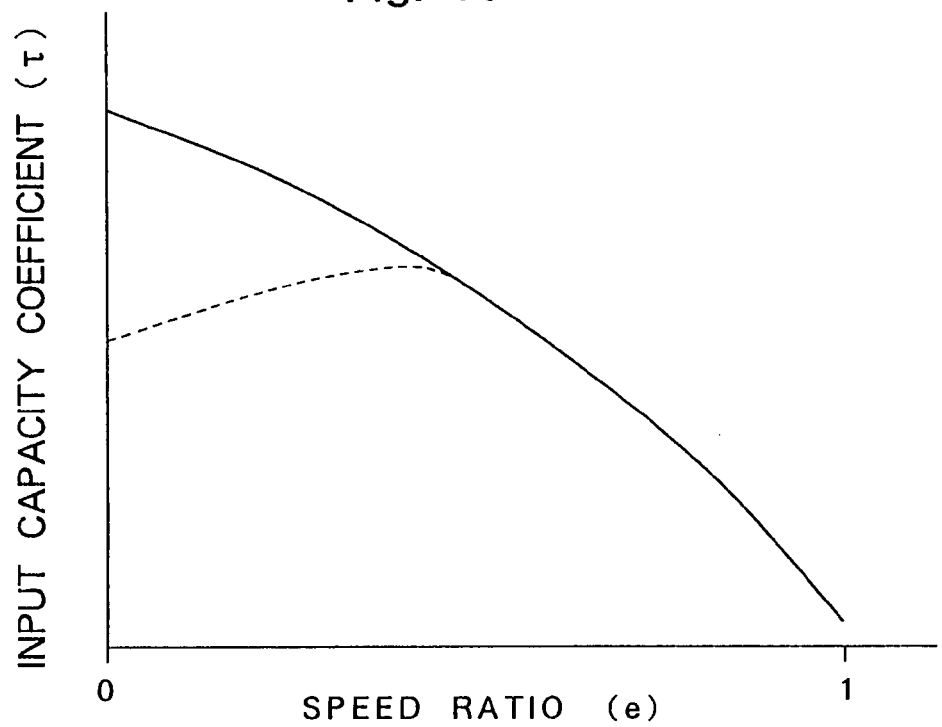
Fig. 10
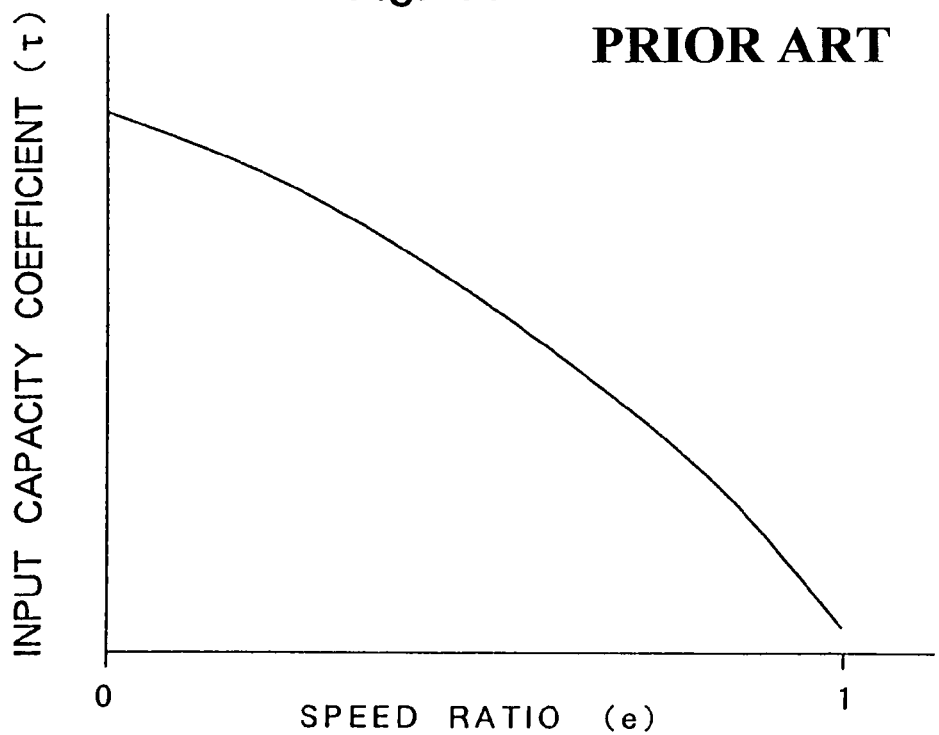
Fig. 11 PRIOR ART

FLUID COUPLING

TECHNICAL FIELD

The present invention relates to improvements in a fluid coupling for transmitting the rotational torque of a prime mover.

BACKGROUND ART

Fluid couplings have heretofore been used as power transmission couplings for ships, industrial machines and automobiles. The fluid coupling comprises a pump having an annular pump shell and a plurality of impellers radially arranged in the pump shell, and a turbine having an annular turbine shell and a plurality of runners radially arranged in the turbine shell, and is arranged being opposed to the pump, the pump and the turbine being filled with an operation fluid. The thus constituted fluid coupling has the pump that is coupled to a crank shaft (input shaft for the fluid coupling) of, for example, a diesel engine which is a prime mover, and has the turbine that is mounted on an output shaft that is arranged in concentric with the input shaft.

There has further been used a fluid coupling in which the pump shell and the turbine shell are provided with an annular core-ring for orienting the operation fluid.

FIG. 11 illustrates characteristics of a general fluid coupling, wherein the abscissa represents a speed ratio (e) of the pump and the turbine, and the ordinate represents an input capacity coefficient ($\tau$) of the fluid coupling. As will be understood from FIG. 11, the input capacity coefficient ($\tau$) of the fluid coupling becomes a maximum in a state where the speed ratio (e) of the pump and the turbine is zero (0), i.e., in a state where the pump is rotating while the turbine is halting. When the drive unit of a vehicle is equipped with the fluid coupling having the above-mentioned characteristics, a drag torque is inevitably produced in a state where the engine is running with a speed change gear of a transmission being engaged while the vehicle is at rest, i.e., in a state where the input shaft is rotating while the output shaft is halting. The drag torque stands for a transmission torque in a state where the engine is running at an idling speed (e.g., 500 rpm). A large drag torque greatly impairs the stability of idling operation of the engine, and unstable rotation causes the occurrence of abnormal vibration in the drive system. Further, a large drag torque becomes a cause of deteriorating the fuel efficiency during the idling operation.

As a measure for decreasing the drag torque, there has been known a technology for arranging a baffle plate between the pump and the turbine.

A measure for decreasing the drag torque by arranging the baffle plate will now be described with reference to FIGS. 12 and 13. In a fluid coupling shown in FIG. 12, an annular baffle plate BP is mounted on an output shaft OS being arranged between the pump P and the turbine T. In a fluid coupling shown in FIG. 13, on the other hand, an annular baffle plate BP is arranged along the outer circumferential portion of the pump P.

The fluid couplings shown in FIGS. 12 and 13 are using fixed baffle plates which are effective in varying the characteristics of the input capacity coefficient ($\tau$) relative to the speed ratio (e) of the pump and the turbine, but are not capable of varying the $\tau$-characteristics relative to the input rotational speed. That is, when $\tau$ (e=0) is lowered to cope with the drag torque, the drag torque during the idling can be decreased to be smaller than that of when there is no baffle plate also causing, however, a decrease in the transmission of torque at the time of start. Namely, the engine must be rotated at an unnecessarily increased speed to start deteriorating, however, the fuel efficiency. On the other hand, when $\tau$ (e=0) is increased to increase the transmission of torque at the start, a start torque can be obtained causing, however, an increase in the drag torque during the idling and deteriorating the fuel efficiency during the idling. In the fluid couplings using the fixed baffle plate as described above, there exists a trade-off relationship between the drag torque during the idling and the fuel efficiency, which cannot be solved.

In order to decrease the drag torque, further, JP-A-2001-50309 is proposing a fluid coupling having an annular baffle plate mounted on the inner circumference or on the outer circumference of the core ring of the pump shell or of the core ring of the turbine shell.

When the drive unit of a vehicle is equipped with the fluid coupling, the characteristics thereof should desirably be to lower the transmission of torque during the idling where the speed ratio (e) of the pump and the turbine is zero (0), i.e., when the pump is rotating while the turbine is halting, without sacrificing the transmission of torque at the start of when the engine is rotated at a speed, i.e., when the rotational speed of the pump is high. The fluid coupling disclosed in the above JP-A-2001-50309 is capable of effectively decreasing the transmission of torque or the drag torque during the idling but inevitably results in a decrease in the transmission of torque at the start of when the engine is rotated at a high speed, i.e., when the rotational speed of the pump is high since the baffle plate has been fixed, which, therefore, is not satisfactory yet.

DISCLOSURE OF THE INVENTION

It is, therefore, an object of the present invention to provide a fluid coupling which is capable of effectively decreasing the drag torque without sacrificing the transmission of torque.

In order to achieve the above object according to the present invention, there is provided a fluid coupling comprising:

a pump having an annular pump shell with an annular core ring mounted on a pump hub and a plurality of impellers radially arranged in the pump shell;

a turbine arranged being opposed to the pump and having an annular turbine shell with an annular core ring mounted on a turbine hub capable of rotating relative to the pump hub and a plurality of runners radially arranged in the turbine shell; and an operation fluid filled in the pump and in the turbine; wherein, the turbine is so constituted as to slide on the turbine hub in the axial direction thereof, and has resilient urging means for urging the turbine in a direction to separate away from the pump side; and the core ring of the pump and the core ring of the turbine are so constituted that the gaps for flowing the operation fluid into the two core rings are increased in a state where the turbine is close to the pump and that the gaps for flowing the operation fluid into the two core rings are decreased as the turbine separates away from the pump shell.

According to the present invention, there is further provided a fluid coupling comprising:

a pump having an annular pump shell with an annular core ring mounted on a pump hub and a plurality of impellers radially arranged in the pump shell;

a turbine arranged being opposed to the pump and having an annular turbine shell with an annular core ring mounted on a turbine hub capable of rotating relative to the pump hub and a plurality of runners radially arranged in the turbine shell; and an operation fluid filled in the pump and in the turbine; wherein, the turbine is so constituted as to slide on the turbine hub in the axial direction thereof, and has centrifugal pushing means for separating the turbine away from the pump side by the action of a centrifugal force produced accompanying the rotation of the turbine; and the core ring of the pump and the core ring of the turbine are so constituted that the gaps for flowing the operation fluid into the two core rings are increased in a state where the turbine is close to the pump and that the gaps for flowing the operation fluid into the two core rings are decreased as the turbine separates away from the pump shell.

The centrifugal pushing means comprises an annular guide member arranged being opposed to the inner surface of the inner circumferential portion of the turbine shell and is mounted on the turbine hub, and a plurality of centrifugal acting members arranged between the guide member and the inner surface of the inner circumferential portion of the turbine shell.

Being constituted as described above, the fluid coupling of the present invention makes it possible to decrease the transmission of torque from the pump to the turbine, i.e., to effectively decrease the drag torque in a state where the speed ratio (e) of the pump and the turbine is zero (0), i.e., in a state where the pump is rotating while the turbine is halting, without sacrificing the transmission of torque in a state where the speed ratio (e) of the pump and the turbine is close to 1.0.

BRIEF DESCRIPTION OF THE DRAWINGS

FIG. 10 is a diagram of characteristics of the fluid coupling constituted according to the present invention;

FIG. 11 is a diagram of characteristics of a fluid coupling used so far;

BEST MODE FOR CARRYING OUT THE INVENTION

The invention will be described in further detail with reference to the accompanying drawings illustrating preferred embodiments of the fluid coupling constituted according to the invention.

Figure 1:
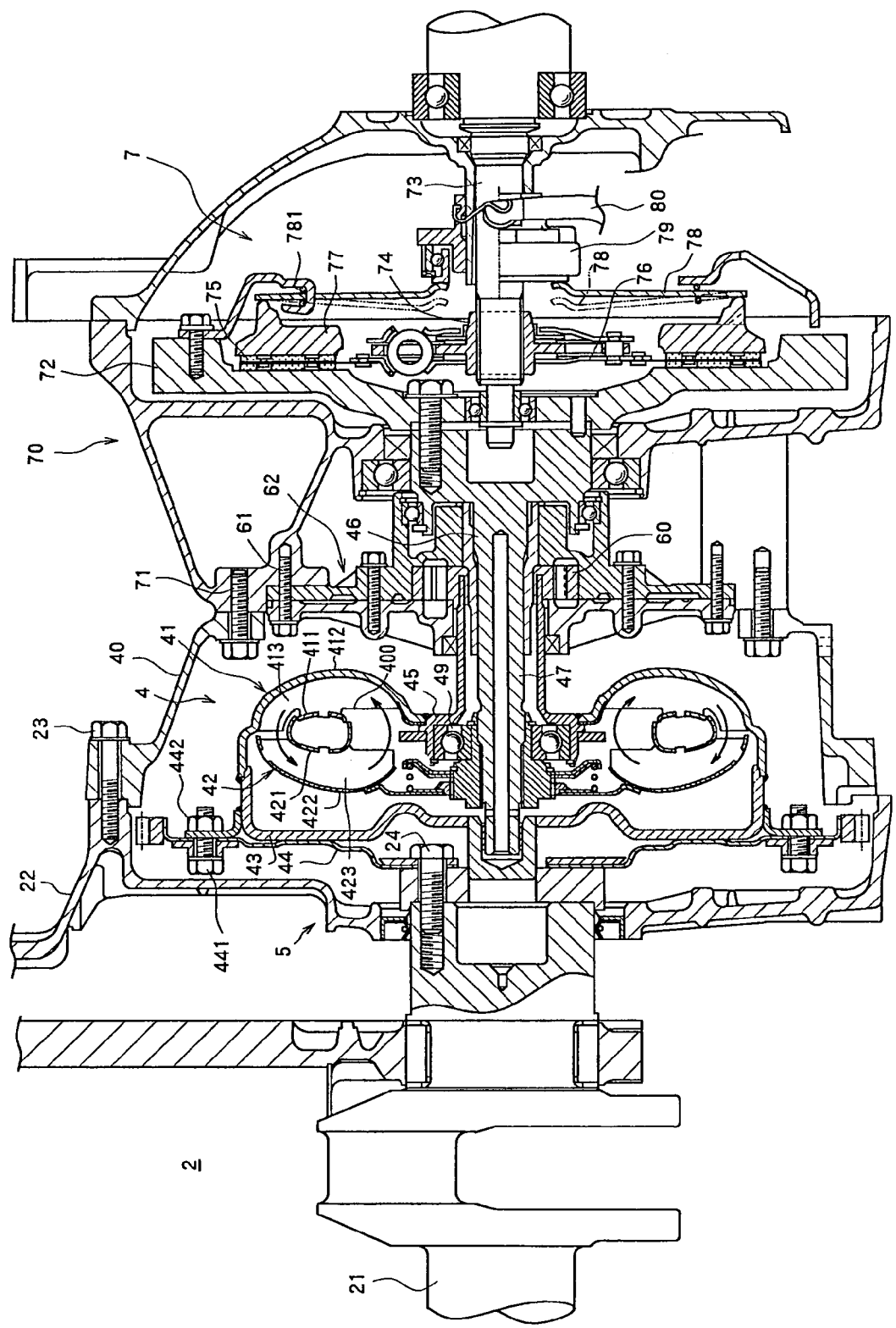
FIG. 1 is a sectional view illustrating an embodiment of a drive unit equipped with a fluid coupling constituted according to the present invention.

FIG. 1 illustrates an embodiment of a drive unit in which a fluid coupling constituted according to the present invention is arranged between an automotive engine and a friction clutch. The drive unit of the embodiment that is shown is constituted by an internal combustion engine 2 which is a prime mover, a fluid coupling 4 constituted according to the invention, and a friction clutch 7. The internal combustion engine 2 in the illustrated embodiment is a diesel engine, and the fluid coupling 4 is attached, on the pump side thereof that will be described later, to an end of a crank shaft 21.

The fluid coupling 4 is arranged in a fluid coupling housing 40 which is mounted by such fastening means as bolts 23 or the like on a housing 22 that is mounted on the diesel engine 2. The fluid coupling 4 in the illustrated embodiment includes a pump 41, a turbine 42 arranged being opposed to the pump 41, and a casing 43 coupled to the pump 41 surrounding the turbine 42. The fluid coupling 4 will now be described with reference to FIG. 1 together with FIGS. 2 and 3.

The pump 41 constituting the fluid coupling 4 includes an annular pump shell 412 having an annular core ring 411, and a plurality of impellers 413 radially arranged in the pump shell 412, the pump shell 412 being mounted on the casing 43 by such fixing means as welding or the like. The casing 43 is mounted by using such fastening means as bolts 441 and nuts 442 on the outer circumferential portion of the drive plate 44 which is mounted at its inner circumferential portion on the crank shaft 21 by bolts 24. Thus, the pump shell 412 of the pump 41 is coupled to the crank shaft 21 via the casing 43 and the drive plate 44. Therefore, the crank shaft 21 works as an input shaft for the fluid coupling 4. The thus constituted pump 41 has the pump shell 412 that is mounted at its inner circumferential portion on a pump hub 45 by such fixing means as welding or the like.

The turbine 42 includes an annular turbine shell 422 having an annular core ring 421 arranged being opposed to the pump shell 412 of the pump 41, and a plurality of runners 423 radially arranged in the turbine shell 422. An annular boss 46 having internal splines 461 in the inner circumferential surface thereof is attached to the inner circumferential portion of the turbine shell 421. The boss 46 is arranged to slide in the axial direction of the turbine hub 48 that is spline-fitted to an output shaft 47 which is in concentric with the crank shaft 21 that is the input shaft. That is, external splines 481 are formed in the outer circumferential surface of the turbine hub 48, and the internal splines 461 of the boss 46 are spline-fitted to the external splines 481, so that the boss 46 or the turbine shell 421 is mounted on the turbine hub 48 so as to slide in the axial direction thereof. A bearing 49 is arranged between the turbine hub 48 and the pump hub 45. Therefore, the pump hub 45 and the turbine hub 48 are allowed to rotate relative to each other.

The fluid coupling 4 in the illustrated embodiment includes resilient urging means 5 for urging the turbine 42 to separate away from the side of the pump 41. The resilient urging means 5 includes a spring mount 51 mounted on the turbine hub 48 on the inside of the turbine shell 421, i.e., on the side of the pump 41 (right side in FIGS. 1 to 3), and a compression coil spring 52 arranged between the spring mount 51 and the turbine shell 421, and urges the turbine 42 in a direction to separate away from the side of the pump 41 (toward the left in FIGS. 1 to 3). Internal splines 511 are formed in the spring mount 51, and are spline-fitted to the external splines 481 of the turbine hub 48. The spring mount 51 is limited from moving toward the side of the pump 41 (toward the right in FIGS. 1 to 3) by a snap ring 53 that is mounted on the turbine hub 48 on the inner side of the spring mount 51, i.e., on the side of the pump 41 (on the right side in FIGS. 1 to 3). A stopper 54 is mounted on the outer circumference at the left end of the turbine hub 48 in FIGS. 1 to 3 to limit the turbine 42 from moving leftward from the separated position shown in FIG. 2, i.e., from moving in a direction in which turbine 42 separates away from the pump 41.

Here, the core ring 411 of the pump 41 and the core ring 421 of the turbine 42 will be described with reference to FIGS. 2 and 3.

Figure 2:
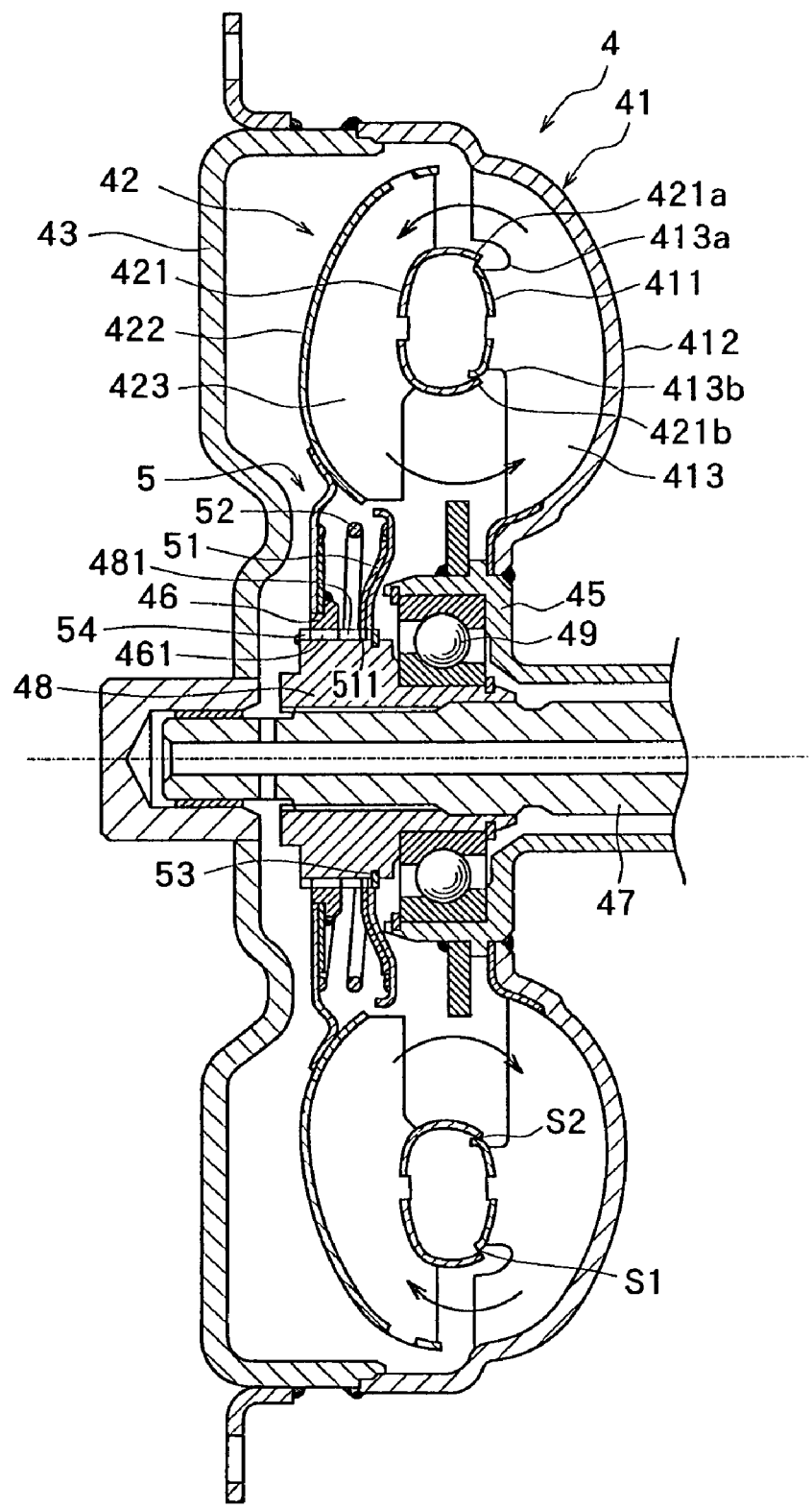
FIG. 2 is a sectional view illustrating an embodiment of the fluid coupling constituted according to the present invention, and illustrates a state where the speed ratio (e) of a pump and a turbine is 1.
Figure 3:
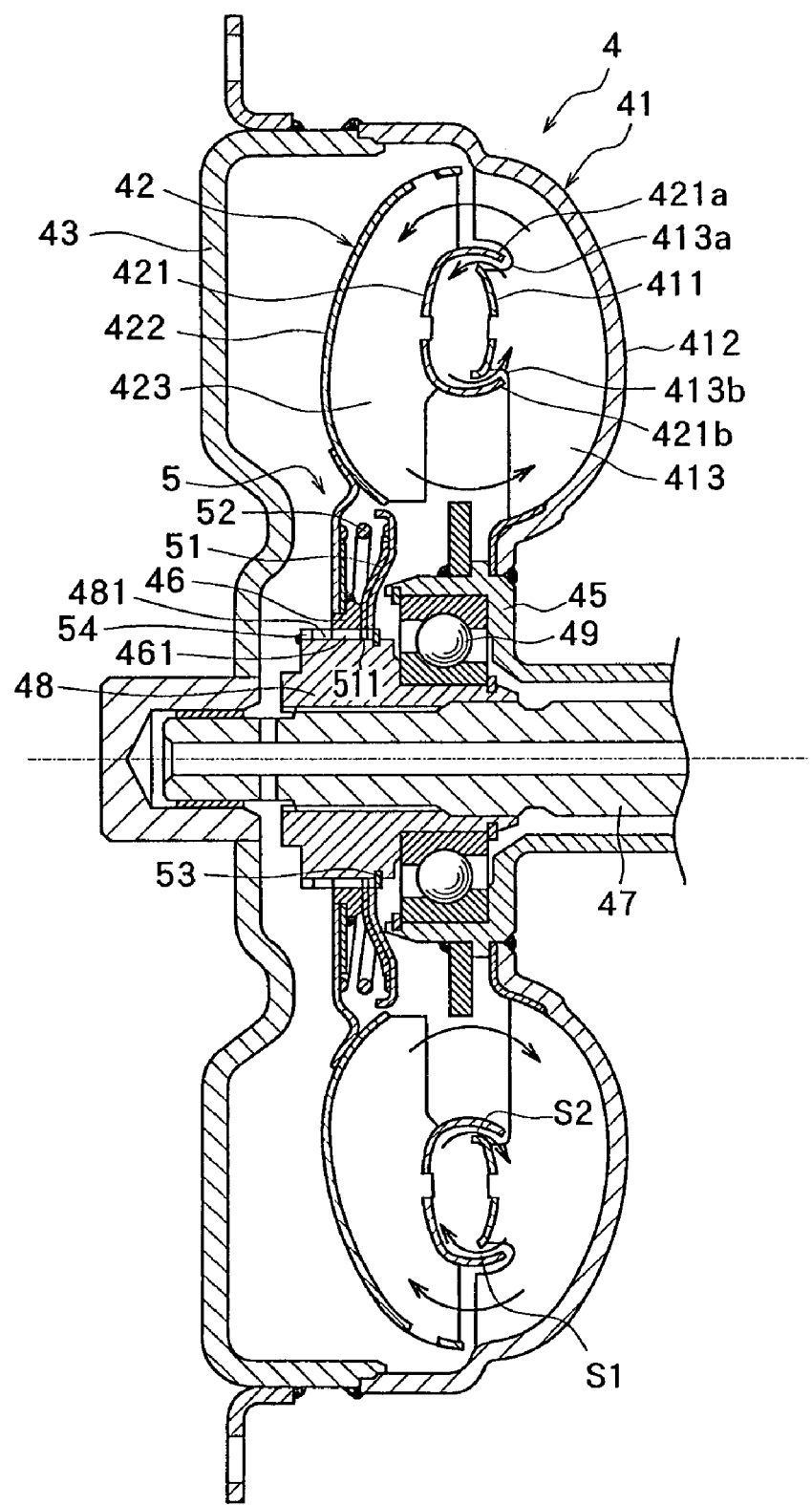
FIG. 3 is a sectional view illustrating a state where the speed ratio (e) of the pump and the turbine in the fluid coupling shown in FIG. 2 is zero.

In the embodiment shown in FIGS. 2 and 3, the core ring 421 of the turbine 42 has its outer circumferential portion 421a and inner circumferential portion 421b formed protruding toward the side of the pump 41. On the other hand, the plurality of impellers 413 in the pump 41 are forming recessed portions 413a and 413b for avoiding interference with the outer circumferential portion 421a and the inner circumferential portion 421b of the core ring 421 of the turbine 42. The core ring 411 of the pump 41 is formed in a size that is held in the core ring 421 of the turbine 42. In a state where the turbine 42 is close to the pump 41 as shown in FIG. 3, therefore, a gap S1 between the outer circumferential ends and a gap S2 between the inner circumferential ends of the two core rings increase. As the turbine 42 separates away from the pump 41, therefore, the gap S1 between the outer circumferential ends and the gap S2 between the inner circumferential ends of the two core rings decrease. At the separated position shown in FIG. 2, the gap S1 between the outer circumferential ends and the gap S2 between the inner circumferential ends of the two core rings become a minimum.

If further described with reference to FIG. 1, the fluid coupling 4 of the illustrated embodiment includes a hydraulic pump 60. The hydraulic pump 60 is arranged in a pump housing 62 mounted by such fixing means as bolts 61 or the like on a clutch housing 70 that will be described later of the friction clutch 7 mounted on the fluid coupling housing 40. The hydraulic pump 60 is so constituted as to be rotated by the pump hub 45, and feeds the operation fluid into the pump 41 and into the turbine 42 through a fluid passage that is not shown.

Next, the friction clutch 7 will be described.

The friction clutch 7 is arranged in the clutch housing 70 mounted by bolts 71 on the fluid coupling housing 40. The friction clutch 7 in the illustrated embodiment includes a clutch drive plate 72 mounted on the output shaft 47 of the fluid coupling 4, a transmission shaft 73 (input shaft of a transmission that is not shown in the illustrated embodiment) arranged in concentric with the output shaft 47, a driven plate 76 mounted on a clutch hub 74 spline-fitted to the transmission shaft 73 and having a clutch facing 75 attached to the outer circumferential portion thereof, a pressure plate 77 for pushing the driven plate 76 onto the clutch drive plate 72, a diaphragm spring 78 for urging the pressure plate 77 toward the clutch drive plate 72, a release bearing 79 which engages with an inner end of the diaphragm spring 78 and operates with an intermediate portion of the diaphragm spring 78 as a fulcrum 781, and a clutch release fork 80 for operating the release bearing 79 in the axial direction. When the thus constituted friction clutch 7 is in a state that is shown, the pressure plate 77 is pushed onto the clutch drive plate 72 due to the resilient force of the diaphragm spring 78, whereby the clutch facing 75 mounted on the drive plate 76 is pushed onto the clutch drive plate 72, and the driving force transmitted to the output shaft 47 of the fluid coupling 4 is transmitted to the transmission shaft 73 via the clutch drive plate 72 and the driven plate 76. To shut off the transmission of power, the hydraulic pressure is fed to a slave cylinder that is not shown to operate the clutch release fork 80 thereby to move the release bearing 79 leftward in FIG. 1. Then, the diaphragm spring 78 is operated as indicated by a two-dot chain line in the drawing to release the pushing force exerted on the pressure plate 77 interrupting the transmission of power from the clutch drive plate 72 to the driven plate 76.

The drive unit equipped with the fluid coupling of the illustrated embodiment is constituted as described above. The operation will now be described.

The driving force produced on the crank shaft 21 (input shaft) of the diesel engine 2 is transmitted to the casing 43 of the fluid coupling 4 through the drive plate 44. The casing 43 and the pump shell 412 of the pump 41 are integrally constituted and, hence, the pump 41 is rotated by the driving force. When the pump 41 rotates, the operation fluid in the pump 41 flows toward the outer circumference along the impellers 413 due to the centrifugal force, and flows into the side of the turbine 42 as indicated by an arrow. The operation fluid that has flown into the side of the turbine 42, then, flows toward the inner circumferential side and is returned back into the pump 41 as indicated by an arrow. Thus, as the operation fluid in the pump 41 and in the turbine 42 circulates through the pump 41 and the turbine 42, the driving torque on the side of the pump 41 is transmitted to the side of the turbine 42 through the operation fluid. The driving force transmitted to the side of the turbine 42 is, then, transmitted to the output shaft 47 via the turbine shell 422, boss 46 and turbine hub 48, and is, further, transmitted to a transmission that is not shown via the friction clutch 6.

Next, described below are torque transmission characteristics of the above-mentioned fluid coupling 4.

When the engine is in an idling state where the speed ratio (e) of the pump 41 and the turbine 42 is zero (0), i.e., the pump 41 is rotating while the turbine 42 is halting, the circulating force of the operation fluid becomes a maximum in the fluid coupling 4. When the operation fluid circulates in the fluid coupling 4, a positive pressure is produced on the front sides of the runners 423 of the turbine 42, i.e., on the sides onto where the operation fluid acts flowing from the side of the pump 41, and a negative pressure is produced on the back sides thereof, i.e., on the sides opposite to the surfaces on where the operation fluid acts flowing from the side of the pump 41. The pressure differential produced between the front sides and the back sides of the runners 423 becomes great toward the outer circumferential side of the turbine 42. As the operation fluid circulates efficiently, the pressure differential increases between the front sides and the back sides of the runners 423, and the negative pressure increases on the back sides. Therefore, the negative pressure becomes a maximum on the back sides of the runners 423 when the engine is in the idling state where speed ratio (e) of the pump 41 and the turbine 42 is zero (0), i.e., where the pump 41 is rotating while the turbine 42 is halting producing a maximum circulating force of the operation fluid in the fluid coupling 4. Therefore, the turbine 42 is pulled toward the side of the pump 41 as shown in FIG. 3 (pulled toward the right in FIG. 3) overcoming the resilient force of the compression coil spring 52 that constitutes the resilient urging means 5. This increases the gap S1 between the outer circumferential ends and the gap S2 between the inner circumferential ends of the core ring 411 of the pump 41 and of the core ring 421 of the turbine 42. As a result, the operation fluid circulating through the pump shell 412 and the turbine shell 422 partly flows into a chamber formed by the two core rings passing through the gap S1 between the outer circumferential ends of the core ring 411 of the pump 41 and of the core ring 421 of the turbine 42, and circulates being returned back into the pump shell 412 through the gap S2 between the inner circumferential ends of the core ring 411 of the pump 41 and of the core ring 421 of the turbine 42 as indicated by arrows in FIG. 3. Therefore, the operation fluid circulates in decreased amounts from the side of the pump 41 to the side of the turbine 42 and, hence, the torque is transmitted less from the pump 41 to the turbine 42.

In the state where the speed ratio (e) of the pump 41 and the turbine 42 is zero (0) as described above, the circulating force of the operation fluid becomes a maximum in the fluid coupling 4. As the speed ratio (e) approaches 1.0, however, the circulating force of the operation fluid becomes weak in the fluid coupling 4 irrespective of an increase in the rotational speed. Therefore, the negative pressure decreases on the back sides of the runners 423 of the turbine 42. Hence, the turbine 42 moves in a direction (toward the left in FIG. 2) to separate away from the pump 41 as shown in FIG. 2 due to the resilient force of the compression coil spring 52 constituting the resilient urging means 5. As a result, the gaps S1 and S2 gradually decrease between the outer circumferential ends and between the inner circumferential ends of the core ring 411 of the pump 41 and of the core ring 421 of the turbine 42, the operation fluid returns in a gradually decreasing amount toward the side of the pump 41 through a chamber formed by the core ring 411 of the pump 41 and by the core ring 421 of the turbine 42, and the torque that is transmitted increases.

Characteristics of the above-mentioned fluid coupling 4 will now be described with reference to a characteristics diagram shown in FIG. 10. In FIG. 10, the abscissa represents the speed ratio (e) of the pump and the turbine, and the ordinate represents the input capacity coefficient ($\tau$) of the fluid coupling. In FIG. 10, a solid line represents the characteristics of a conventional fluid coupling in which the turbine 42 is fixed at a position shown in FIG. 2, and a broken line represents the characteristics of the fluid coupling 4 of the above illustrated embodiment. In the state where the speed ratio (e) of the pump 41 and the turbine 42 is zero (0) as represented by the broken line in FIG. 10, the fluid coupling 4 of the illustrated embodiment exhibits an input capacity coefficient ($\tau$) that is greatly decreased as compared to that of the conventional fluid coupling represented by the solid line. That is, in the state where the speed ratio (e) of the pump 41 and the turbine 42 is zero (0) as described above, the negative pressure increases on the back sides of the runners 423 of the turbine 42, the turbine 42 is pulled toward the side of the pump 41 as shown in FIG. 3 overcoming the resilient force of the compression coil spring 52 that constitutes the resilient urging means 5, and the gaps S1 and S2 increase between the outer circumferential ends and between the inner circumferential ends of the core ring 411 of the pump 41 and of the core ring 421 of the turbine 42. Therefore, the operation fluid circulating through the pump shell 412 and the turbine shell 422 partly flows into a chamber formed by the two core rings passing through the gap S1 between the outer circumferential ends of the core ring 411 of the pump 41 and of the core ring 421 of the turbine 42, and circulates being returned back into the pump shell 412 through the gap S2 between the inner circumferential ends of the core ring 411 of the pump 41 and of the core ring 421 of the turbine 42. Therefore, the operation fluid circulates in decreased amounts from the side of the pump 41 to the side of the turbine 42 and, hence, the input capacity coefficient ($\tau$) greatly decreases as compared to that of the conventional fluid coupling. Accordingly, it is made possible to greatly decrease the drag torque during the engine idling operation establishing a state where the pump 41 is rotating while the turbine 42 is halting. On the other hand, as the speed ratio (e) of the pump 41 and the turbine 42 approaches 1.0, however, the circulating force of the operation fluid becomes weak in the fluid coupling 4 irrespective of an increase in the rotational speed. Therefore, the gaps S1 and S2 gradually decrease between the outer circumferential ends and between the inner circumferential ends of the core ring 411 of the pump 41 and of the core ring 421 of the turbine 42, and the operation fluid returns in a gradually decreasing amount back to the side of the pump 41 through a chamber formed by the core ring 411 of the pump 41 and by the core ring 421 of the turbine 42. Therefore, the input capacity coefficient ($\tau$) is gradually brought into agreement with the characteristics of the fluid coupling in which the turbine 42 has been fixed as represented by the broken line in FIG. 10. Therefore, the torque that is transmitted does not decrease in the state where the speed ratio (e) of the pump 41 and the turbine 42 is close to 1.0.

Another embodiment of the fluid coupling constituted according to the present invention will be described next with reference to FIGS. 4 and 5. In the embodiment shown in FIGS. 4 and 5, the same members as those of the embodiment shown in FIGS. 2 and 3 are denoted by the same reference numerals but their description is not repeated.

Figure 4:
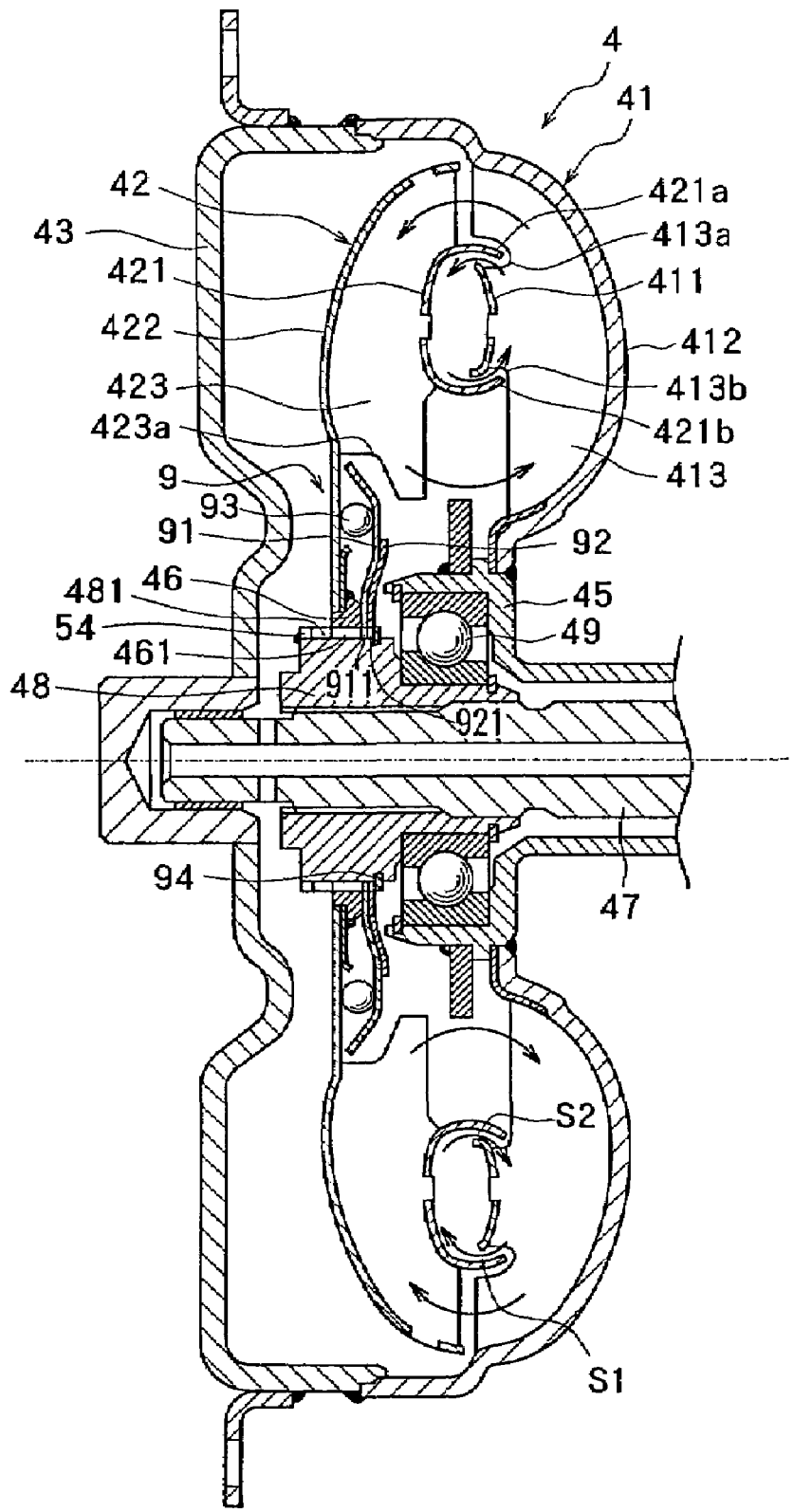
FIG. 4 is a sectional view illustrating another embodiment of the fluid coupling constituted according to the present invention and shows a state where the speed ratio (e) of the pump and the turbine is zero.
Figure 5:
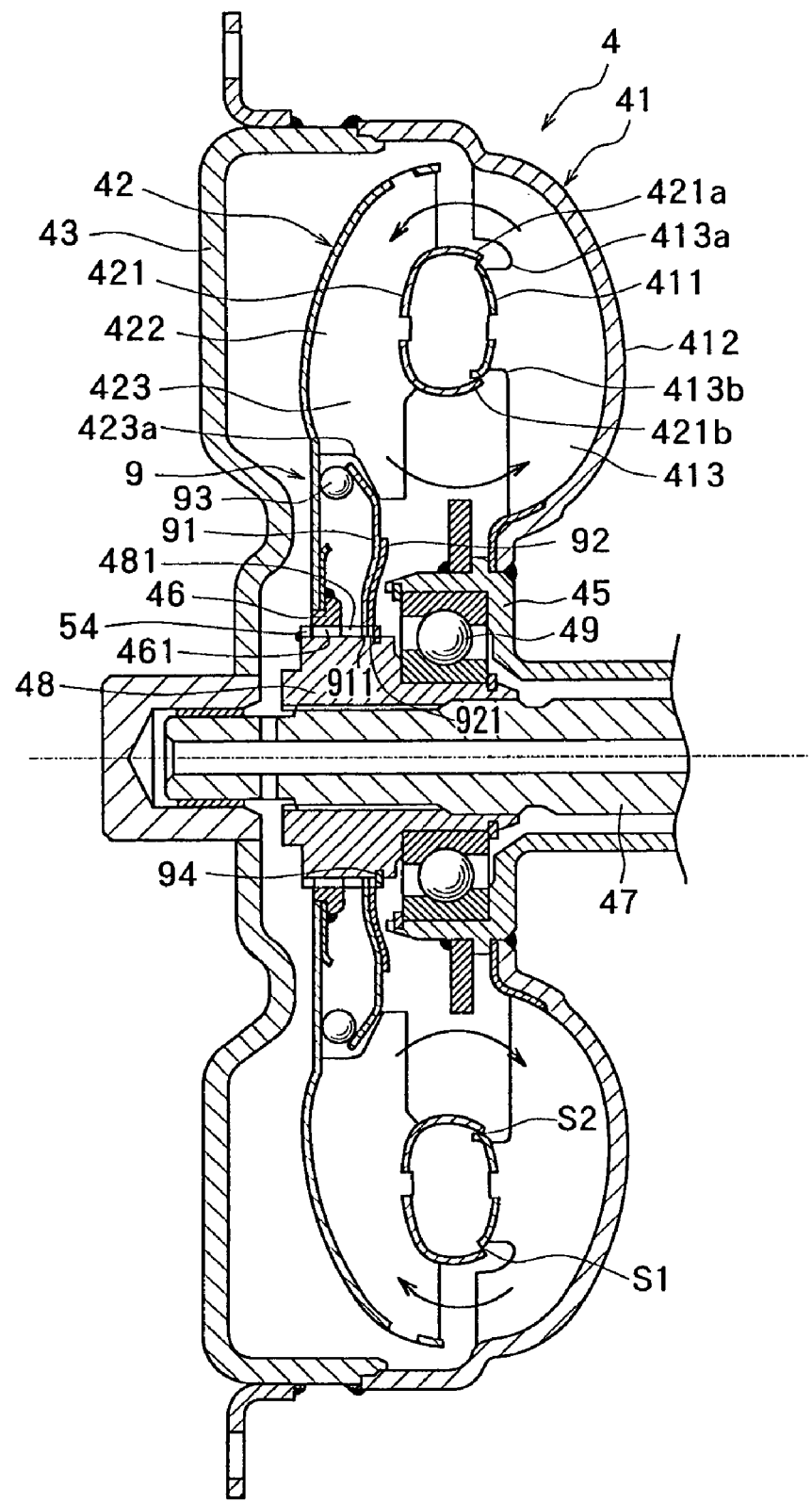
FIG. 5 is a sectional view illustrating a state where the speed ratio (e) of the pump and the turbine in the fluid coupling shown in FIG. 4 is 1.

The fluid coupling 4 of the embodiment shown in FIGS. 4 and 5 is equipped with centrifugal pushing means 9 for separating the turbine 42 away from the side of the pump 41 by the action of a centrifugal force produced accompanying the rotation of the turbine 42 instead of the resilient urging means 5 that urges the turbine 42 in a direction to separate away from the side of the pump 41. The centrifugal pushing means 9 of the illustrated embodiment comprises a guide member 91 arranged being opposed to the inner surface of the inner circumferential portion of the turbine shell 421 that constitutes the turbine 42, a reinforcing member 92 arranged by the guide member 91 on the side of the pump 41, and a plurality of centrifugal balls 93 that work as centrifugal operation members being arranged between the inner surface of the inner circumferential portion of the turbine shell 421 and the guide member 91. The guide member 91 and the reinforcing member 92 are both made of annular disks, and have internal splines 911 and 921 formed in the inner circumferential portions thereof. The internal splines 911 and 921 are spline-fitted to the external splines 481 of the turbine hub 48. The guide member 91 and the reinforcing member 92 are limited from moving toward the side of the pump 41 (toward the right in FIGS. 1 and 3) by a snap ring 94 mounted on the turbine hub 48 on the inside of the reinforcing member 92, i.e., on the side of the pump 41 (on the right side in FIGS. 1 and 3). The guide member 91 is formed being curved toward the inner surface of the inner circumferential portion of the turbine shell 421, while the distance between the guide member 91 and the inner surface of the inner circumferential portion of the turbine shell 421 is constituted to become small toward the outer circumference. It is desired that the centrifugal balls 93 are made of a metal having a large mass. In the fluid coupling 4 of the embodiment shown in FIGS. 4 and 5, the turbine shell 421 has an inner circumferential portion that is formed nearly perpendicularly with respect to the axial direction, and the inner circumferential portions of the plurality of runners 423 radially arranged in the turbine shell 421 are cut away as designated at 423a to avoid interference with the guide member 91.

The fluid coupling 4 of the embodiment shown in FIGS. 4 and 5 is constituted as described above. Next, described below are torque transmission characteristics thereof.

When the engine is in an idling state where the speed ratio (e) of the pump 41 and the turbine 42 is zero (0), i.e., the pump 41 is rotating while the turbine 42 is halting, the circulating force of the operation fluid becomes a maximum in the fluid coupling 4. Therefore, the negative pressure becomes a maximum on the back sides of the runners 423 of the turbine 42 like in the embodiment of FIGS. 2 and 3 described above, the turbine 42 is pulled toward the side of the pump 41 as shown in FIG. 4 (pulled toward the right in FIG. 4). This increases the gap S1 between the outer circumferential ends and the gap S2 between the inner circumferential ends of the core ring 411 of the pump 41 and of the core ring 421 of the turbine 42. As a result, the operation fluid circulating through the pump shell 412 and the turbine shell 422 partly flows into a chamber formed by the two core rings passing through the gap S1 between the outer circumferential ends of the core ring 411 of the pump 41 and of the core ring 421 of the turbine 42 as shown in FIG. 4, and circulates being returned back into the pump shell 412 through the gap S2 between the inner circumferential ends of the core ring 411 of the pump 41 and of the core ring 421 of the turbine 42. Therefore, the operation fluid circulates in decreased amounts from the side of the pump 41 to the side of the turbine 42 and, hence, the torque is transmitted less from the pump 41 to the turbine 42.

In the state where the speed ratio (e) of the pump 41 and the turbine 42 is zero (0) as described above, the circulating force of the operation fluid becomes a maximum in the fluid coupling 4. As the speed ratio (e) approaches 1.0, however, the circulating force of the operation fluid becomes weak in the fluid coupling 4 irrespective of an increase in the rotational speed. Therefore, the negative pressure decreases on the back sides of the runners 423 of the turbine 42. When the turbine 42 rotates, on the other hand, a centrifugal force acts on the centrifugal balls 93 in the centrifugal pushing means 9, whereby the centrifugal balls 93 move toward the outer circumference being guided by the side surface of the guide member 91. As shown in FIG. 5, therefore, the centrifugal balls 93 push the inner surface of the turbine shell 422, causing the turbine 42 to move toward the left, i.e., in a direction to separate away from the side of the pump 41. As a result, the gaps S1 and S2 gradually decrease between the outer circumferential ends and between the inner circumferential ends of the core ring 411 of the pump 41 and of the core ring 421 of the turbine 42, the operation fluid returns in a gradually decreasing amount back to the side of the pump 41 through a chamber formed by the core ring 411 of the pump 41 and by the core ring 421 of the turbine 42, and the torque that is transmitted increases. Therefore, the fluid coupling of the embodiment shown in FIGS. 4 and 5 exhibits torque characteristics shown in the drawings as described above.

A further embodiment of the fluid coupling constituted according to the present invention will be described next with reference to FIGS. 6 and 7. In the embodiment shown in FIGS. 6 and 7, the same members as those of the above embodiments are denoted by the same reference numerals but their description is not repeated.

Figure 6:
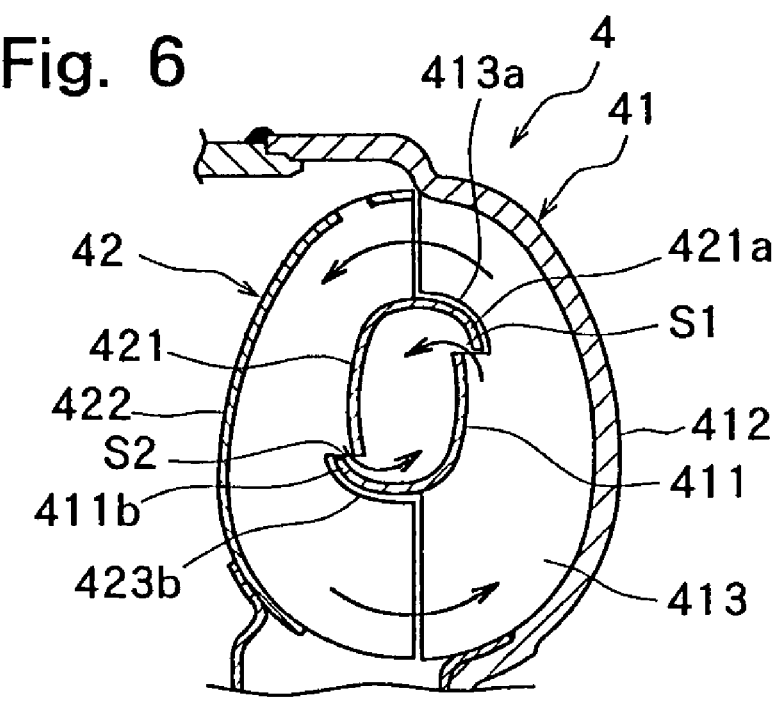
FIG. 6 is a sectional view of a major portion illustrating a further embodiment of the fluid coupling constituted according to the present invention, and shows a state where the speed ratio (e) of the pump and the turbine is zero.
Figure 7:
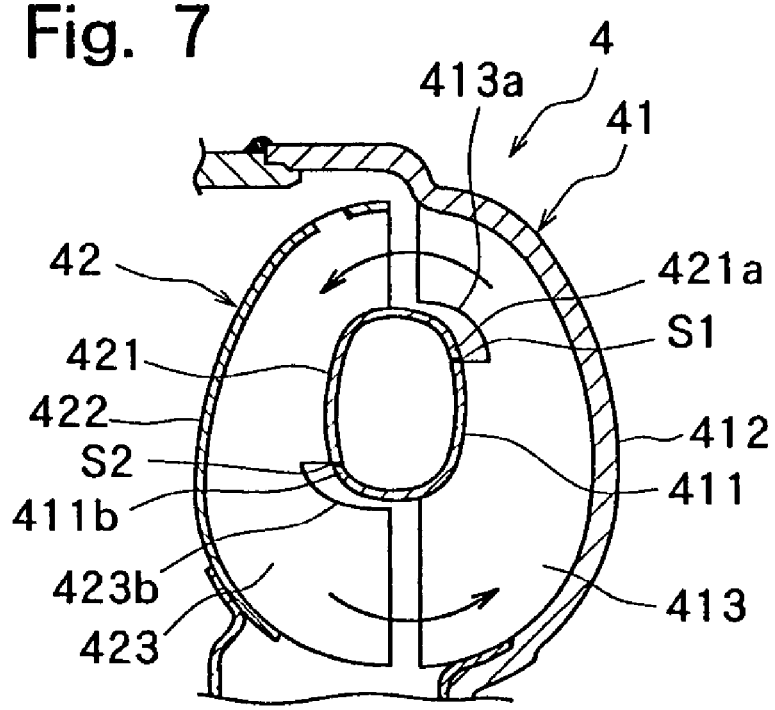
FIG. 7 is a sectional view of a major portion illustrating a state where the speed ratio (e) of the pump and the turbine in the fluid coupling shown in FIG. 6 is zero.

The fluid coupling 4 shown in FIGS. 6 and 7 is the one that modifies the structure of the core ring 411 of the pump 41 and of the core ring 421 of the turbine 42 in the above embodiments.

That is, the outer circumferential portion 421a of the core ring 421 of the turbine 42 is formed protruding toward the side of the pump 41, and the inner circumferential portion 411b of the core ring 411 of the pump 41 is formed protruding toward the side of the turbine 42. On the other hand, recessed portions 413a are formed in the plurality of impellers 413 of the pump 41 to avoid interference with the outer circumferential portion 421a of the core ring 421 of the turbine 42, and recessed portions 413b are formed in the plurality of runners 423 of the turbine 42 to avoid interference with the inner circumferential portion 411b of the core ring 411 of the pump 41. Therefore, in a state where the turbine 42 is brought close to the pump 41 as shown in FIG. 6, the gap S1 between the outer circumferential ends and the gap S2 between the inner circumferential ends of the two core rings increase. The gap S1 between the outer circumferential ends and the gap S2 between the inner circumferential ends of the two core rings decrease as the turbine 42 separates away from the pump 41. The gap S1 between the outer circumferential ends and the gap S2 between the inner circumferential ends of the two core rings become a minimum at separated positions shown in FIG. 7. Therefore, the fluid coupling 4 shown in FIGS. 6 and 7, too, exhibit the action and effect same as those of the above-mentioned embodiments.

A still further embodiment of the fluid coupling constituted according to the present invention will be described next with reference to FIGS. 8 and 9. In the embodiment shown in FIGS. 8 and 9, the same members as those of the above embodiments are denoted by the same reference numerals but their description is not repeated.

Figure 8:
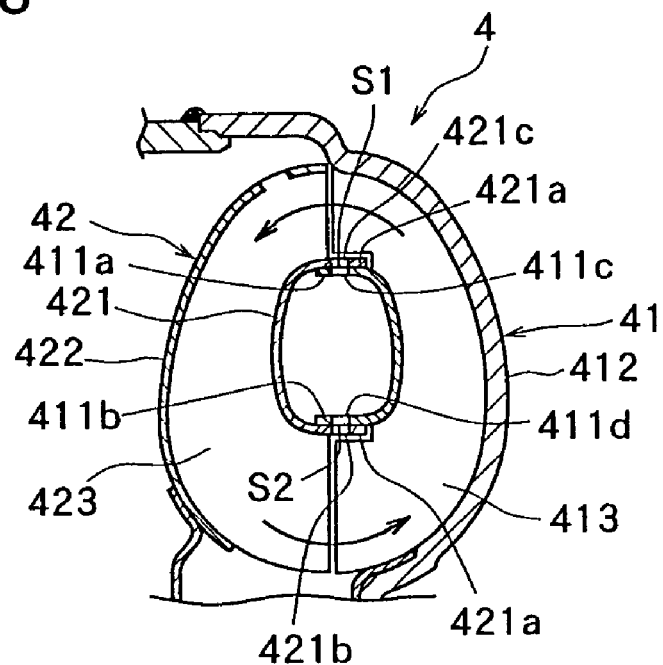
FIG. 8 is a sectional view of a major portion illustrating a still further embodiment of the fluid coupling constituted according to the present invention, and shows a state where the speed ratio (e) of the pump and the turbine is zero.
Figure 9:
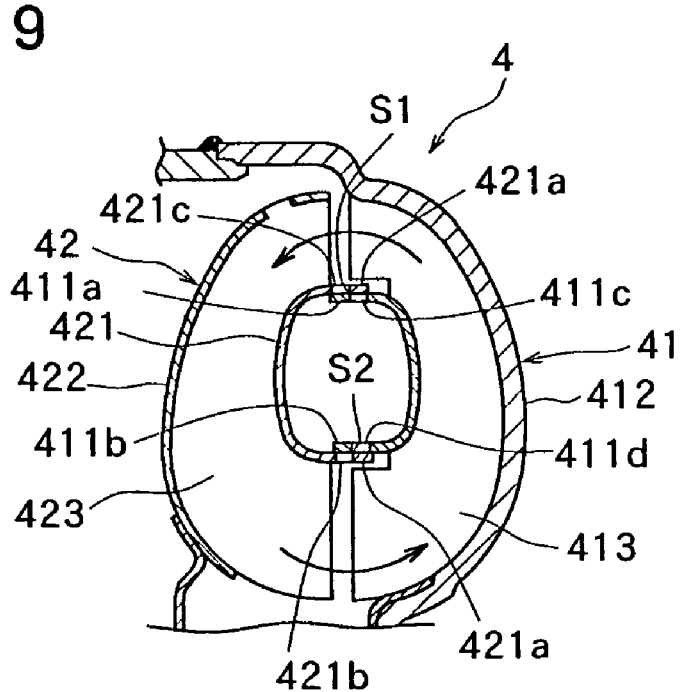
FIG. 9 is a sectional view of a major portion illustrating a state where the speed ratio (e) of the pump and the turbine in the fluid coupling shown in FIG. 8 is zero.
Figure 12:
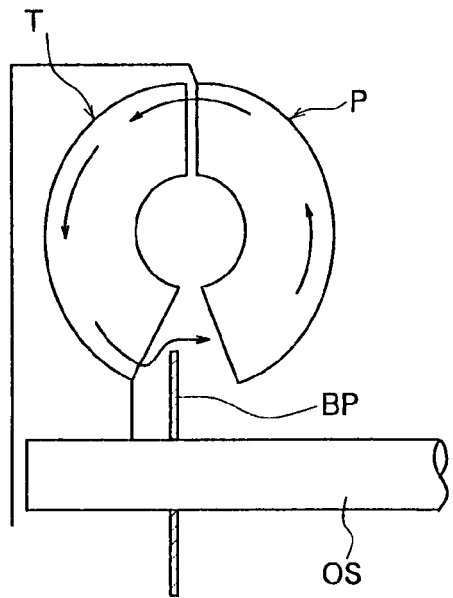
FIG. 12 is a view illustrating the flow of the operation fluid in a fluid coupling used so far.
Figure 13:
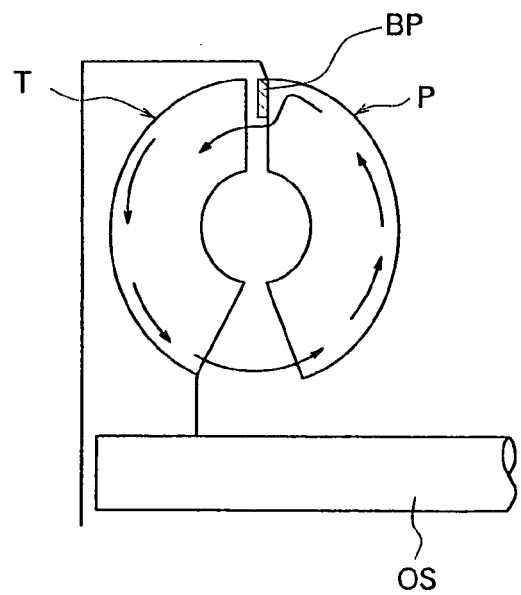
FIG. 13 is a view illustrating the flow of the operation fluid in another fluid coupling used so far.

The fluid coupling 4 shown in FIGS. 8 and 9, too, is the one that modifies the structure of the core ring 411 of the pump 41 and of the core ring 421 of the turbine 42 in the above embodiments. That is, the outer circumferential portion 421a and the inner circumferential portion 421b of the core ring 421 of the turbine 42 are formed protruding toward the side of the pump 41, and the outer circumferential portion 411a and the inner circumferential portion 411b of the core ring 411 of the pump 41 are formed protruding toward the side of the turbine 42. Holes 421c and 421d are, respectively, perforated in the outer circumferential portion 421a and in the inner circumferential portion 421b of the core ring 421 of the turbine 42, and holes 411c and 411d are, respectively, perforated in the outer circumferential portion 411a and in the inner circumferential portion 411b of the core ring 411 of the pump 41. The outer circumferential portion 421a of the core ring 421 of the turbine 42 is so constituted as to be overlapped on the outer circumferential portion 411a of the core ring 411 of the pump 41, and the inner circumferential portion 421b of the core ring 421 of the turbine 42 is so constituted as to be overlapped on the inner circumferential portion 411b of the core ring 411 of the pump 41. In a state where the turbine 42 is brought close to the pump 41 in the thus constituted fluid coupling 4 as shown in FIG. 8, the overlapping amount increases among the holes 421c, 421d perforated in the outer circumferential portion 421a and in the inner circumferential portion 421b of the core ring 421 of the turbine 42 and the holes 411c, 411d perforated in the outer circumferential portion 411a and in the inner circumferential portion 411b of the core ring 411 of the pump 41; i.e., the gaps S1 and S2 increase. When the turbine 42 is separated away from the pump 41 as shown in FIG. 9, on the other hand, the overlapping amount decreases among the holes 421c, 421d perforated in the outer circumferential portion 421a and in the inner circumferential portion 421b of the core ring 421 of the turbine 42 and the holes 411c, 411d perforated in the outer circumferential portion 411a and in the inner circumferential portion 411b of the core ring 411 of the pump 41; i.e., the gaps S1 and S2 decrease. The overlapping amounts or the gaps S1 and S2 become a minimum at separated positions shown in FIG. 9. Therefore, the fluid coupling 4 shown in FIGS. 6 and 7, too, exhibit the action and effect same as those of the above-mentioned embodiments.

The invention claimed is:

1. A fluid coupling comprising:
 a pump having an annular pump shell with an annular core ring mounted on a pump hub and a plurality of impellers radially arranged in the pump shell;
 a turbine arranged being opposed to the pump and having an annular turbine shell with an annular core ring mounted on a turbine hub capable of rotating relative to the pump hub and a plurality of runners radially arranged in the turbine shell; and
 an operation fluid filled in the pump and in the turbine; wherein,
 the turbine is so constituted as to slide on the turbine hub in the axial direction thereof, and has resilient urging means for urging the turbine in a direction to separate away from the pump side; and
 the core ring of the pump and the core ring of the turbine are so constituted that the gaps for flowing the operation fluid into the two core rings are increased in a state where the turbine is close to the pump and that the gaps for flowing the operation fluid into the two core rings are decreased as the turbine separates away from the pump shell.

2. A fluid coupling comprising:
 a pump having an annular pump shell with an annular core ring mounted on a pump hub and a plurality of impellers radially arranged in the pump shell;
 a turbine arranged being opposed to the pump and having an annular turbine shell with an annular core ring mounted on a turbine hub capable of rotating relative to the pump hub and a plurality of runners radially arranged in the turbine shell; and
 an operation fluid filled in the pump and in the turbine; wherein,
 the turbine is so constituted as to slide on the turbine hub in the axial direction thereof, and has centrifugal pushing means for separating the turbine away from the pump side by the action of a centrifugal force produced accompanying the rotation of the turbine; and
 the core ring of the pump and the core ring of the turbine are so constituted that the gaps for flowing the operation fluid into the two core rings are increased in a state where the turbine is close to the pump and that the gaps for flowing the operation fluid into the two core rings are decreased as the turbine separates away from the pump shell.

3. A fluid coupling according to claim 2, wherein said centrifugal pushing means comprises an annular guide member arranged being opposed to the inner surface of the inner circumferential portion of said turbine shell and is mounted on said turbine hub, and a plurality of centrifugal acting members arranged between said guide member and the inner surface of the inner peripheral portion of said turbine shell.

* * * * *